(12) United States Patent
Hunt

(10) Patent No.: US 10,685,345 B2
(45) Date of Patent: Jun. 16, 2020

(54) SYSTEMS AND METHODS FOR ELECTRONIC GEOCACHING

(71) Applicant: MasterCard International Incorporated, Purchase, NY (US)

(72) Inventor: Patrick James Hunt, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1004 days.

(21) Appl. No.: 13/948,588

(22) Filed: Jul. 23, 2013

(65) Prior Publication Data

US 2015/0032527 A1 Jan. 29, 2015

(51) Int. Cl.
*G06Q 20/32* (2012.01)
*G06Q 30/02* (2012.01)
*G06Q 20/38* (2012.01)

(52) U.S. Cl.
CPC ..... *G06Q 20/3226* (2013.01); *G06Q 20/3224* (2013.01); *G06Q 20/3278* (2013.01); *G06Q 20/387* (2013.01); *G06Q 30/0225* (2013.01); *G06Q 30/0256* (2013.01)

(58) Field of Classification Search
CPC combination set(s) only.
See application file for complete search history.

(56) References Cited

U.S. PATENT DOCUMENTS

| | | | |
|---|---|---|---|
| 8,321,246 B1 | 11/2012 | Shah | |
| 8,490,151 B2 | 7/2013 | Boldyrev et al. | |
| 2008/0167129 A1 | 7/2008 | Aaron et al. | |
| 2008/0208688 A1* | 8/2008 | Byerley et al. | 705/14 |
| 2009/0076912 A1* | 3/2009 | Rajan et al. | 705/14 |
| 2009/0227374 A1 | 9/2009 | Tirpak et al. | |
| 2010/0079338 A1* | 4/2010 | Wooden et al. | 342/357.09 |
| 2010/0250359 A1* | 9/2010 | Gillenson et al. | 705/14.25 |
| 2010/0332310 A1 | 12/2010 | Russell et al. | |
| 2011/0076941 A1* | 3/2011 | Taveau et al. | 455/41.1 |
| 2013/0024271 A1 | 1/2013 | Wooden et al. | |
| 2013/0061303 A1 | 3/2013 | Hart et al. | |
| 2013/0138491 A1* | 5/2013 | Gao et al. | 705/14.23 |
| 2013/0173372 A1* | 7/2013 | Misra et al. | 705/14.23 |

FOREIGN PATENT DOCUMENTS

EP  2088750 A1  8/2009

OTHER PUBLICATIONS

What is RFID?, Jun. 11, 2012, Technovelgy.com, http://www.technovelgy.com/ct/Technology-Article.asp?ArtNum=1.*

* cited by examiner

*Primary Examiner* — Eric R Netzloff
*Assistant Examiner* — Dipen M Patel
(74) *Attorney, Agent, or Firm* — Armstrong Teasdale LLP

(57) ABSTRACT

A method and system for transferring electronic units of value to a mobile device using a computer device coupled to a database are provided. The method includes establishing a transfer account associated with the mobile device, initiating, by the mobile device, a transfer of an identifier encoded in a geo.Chip to the mobile device, receiving, by the mobile device, the identifier and a geolocation of the mobile device, transmitting the received identifier and geolocation for verification of the identifier using the geolocation, and receiving, by the mobile device, an indication of the units of value associated with the geo.Chip location.

19 Claims, 7 Drawing Sheets

SYSTEMS AND METHODS FOR ELECTRONIC GEOCACHING

BACKGROUND OF THE DISCLOSURE

This disclosure relates generally to providing incentives to consumers to use a service and, more particularly, to computer systems and computer-based methods for electronic transmission of units of value to mobile devices directed into close proximity to a geolocation.

At least some known technologies require early adopters and/or incentives for the technology to become widely used in the marketplace. One such technology is a digital wallet service that may be used to purchase items using a mobile device enabled with "bump" technology. Although, the technology is secure and convenient, adoption is relatively slow.

Accordingly, it would be desirable to provide a system and/or method for incentivizing consumers to use the digital wallet service to carry out their day-to-day purchases.

BRIEF DESCRIPTION OF THE DISCLOSURE

In one embodiment, a computer-based method for transferring electronic units of value to a mobile device includes establishing a transfer account associated with the mobile device, initiating, by the mobile device, a transfer of an identifier encoded in a geo.Chip to the mobile device, receiving, by the mobile device, the identifier and a geolocation of the mobile device, transmitting the received identifier and geolocation for verification of the identifier using the geolocation, and receiving, by the mobile device, an indication of the units of value associated with the geo.Chip location.

In another embodiment, a computer-based method for transferring electronic units of value to a mobile device includes receiving user information from a user through an electronic communications network, establishing an account for the user associated with the user information, receiving an identifier of a geo.Chip and a geolocation of a mobile device associated with the account, determining that the identifier is associated with an active offer, determining that the received geolocation matches a location of the geo.Chip, and if the identifier is associated with an active offer and the received geolocation matches a location of the geo.Chip, crediting the account with a value associated with the identifier.

In yet another embodiment, a system for transferring electronic units of value to a mobile device includes an electronic communication network, a mobile device communicatively couplable to the network and the mobile device is configured to determine its location in geographic coordinates, a plurality of semiconductor chips, each including an identifier unique to an associated one of the plurality of semiconductor chips wherein the plurality of semiconductor chips each interrogatable by the mobile device whereby the mobile device is able to determine the unique identifier of the interrogated one of the plurality of semiconductor chips, and a geo.Server communicatively couplable to the network, the geo.Server including a processor communicatively coupled to a memory device; the geo.Server programmed to receive a request for respective locations of semiconductor chips positioned proximate a selected location, transmit to a third party server the respective locations for a fee paid from the third party to the location provider.

BRIEF DESCRIPTION OF THE DRAWINGS

FIG. 1 is a schematic diagram illustrating an exemplary multi-party transaction card industry system for enabling payment-by-card transactions in which merchants and card issuers do not need to have a one-to-one special relationship and mobile devices can be used for contactless transactions for offers or payments.

FIG. 2 is a simplified block diagram of an exemplary system including a plurality of computer devices in accordance with one example embodiment of the present disclosure.

FIG. 3 is an expanded block diagram of an exemplary embodiment of a server architecture of the system including the plurality of computer devices in accordance with one example embodiment of the present disclosure.

FIG. 4 illustrates an exemplary configuration of a client system shown in FIGS. 2 and 3.

FIG. 5 illustrates an exemplary configuration of a server system shown in FIGS. 2 and 3.

FIG. 6 illustrates a data flow diagram for a geo.Chip management subsystem associated with system shown in FIG. 1.

FIG. 7 is a flow diagram of an example method of transferring electronic units of value to a mobile device in accordance with an example embodiment of the present disclosure.

DETAILED DESCRIPTION OF THE DISCLOSURE

Figure 1:
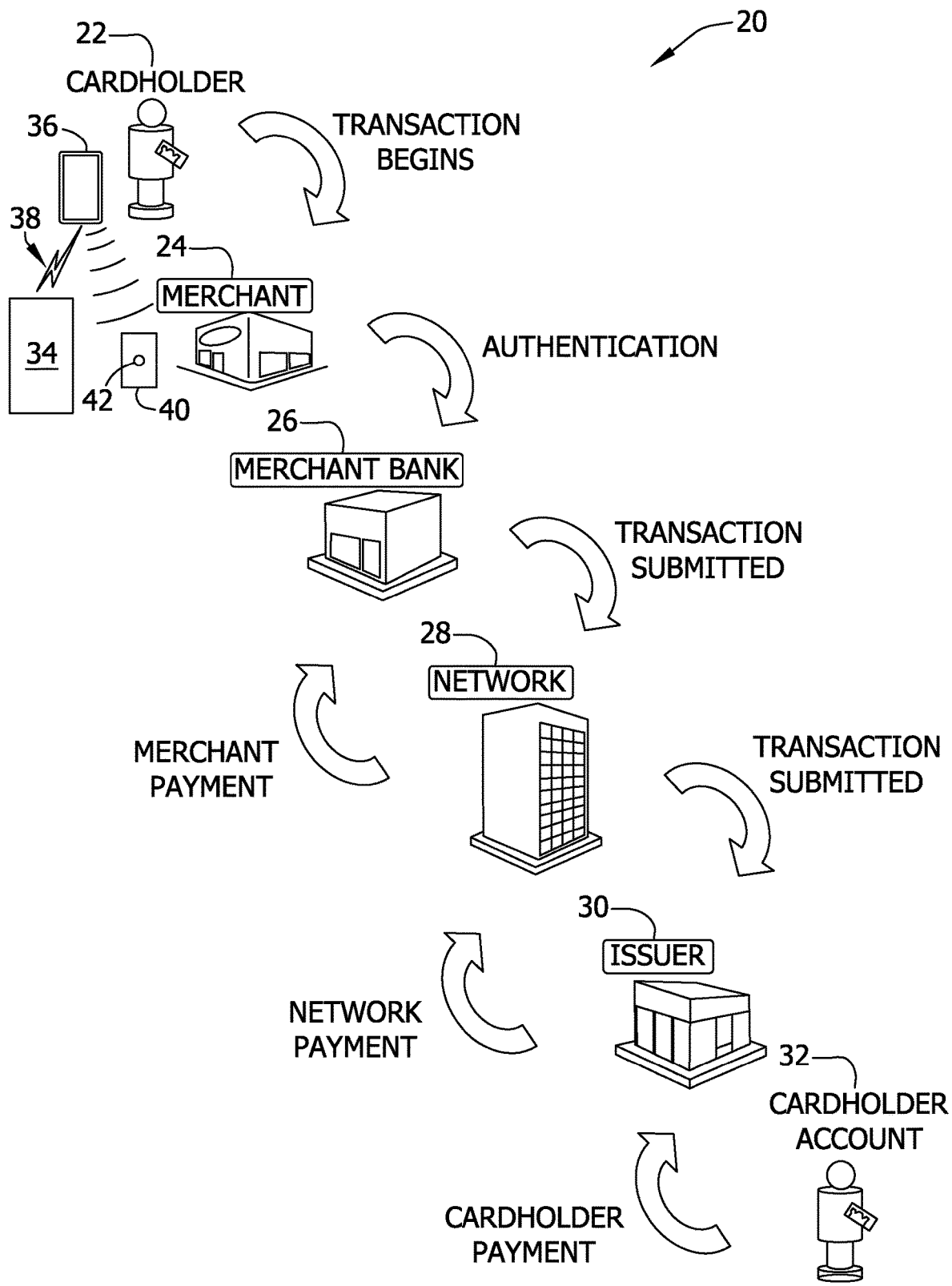
FIGS. 1-7 show exemplary embodiments of the methods and systems described herein.

Embodiments of the methods and systems described herein relate to communicating locations of interrogatable electronic geo.Chips, each with a unique identifier, to a plurality of mobile devices that are associated with consumers. The communications may include responses to location requests directly from a server managing the geo.Chips, a push notification based on consumer preferences or opt-in criteria, or a response to a request to a third party locating service, such as, but, not limited to, location services provided by a handheld navigation device. Once the geo.Chip location has been acquired and the mobile device brought in close proximity to the geo.Chip, a transfer of an identifier associated with the geo.Chip is made from the geo.Chip to the mobile device. The transfer may be made for example, using "bump", near field communications (NFC) technology, or other short range communications technology including for example, optical. The mobile device communicates wirelessly with the server managing the geo.Chips. The server verifies the geo.Chip is associated with an active offer and that the mobile device is proximate the geo.Chip location contemporaneous with the communication. The server can then determine to offer associated with the geo.Chip and communicate the offer to the mobile device. The user can then decide whether to use the offer, save the offer, or trade the offer to another nearby mobile device.

The systems and methods described herein create a geocaching experience with a mobile NFC app that is used to create synergy and better understanding of, for example, a contactless financial transaction card payment technology. Electronic geocaching sites can be created and used globally at random sites or at sites planned cooperatively with merchants as part of a specific awareness program. An existing ATM or contactless payment merchant locator app are used to find new geo.Cache sites and additional features are built into the apps such as special contactless payment feature treasure-finder. In some embodiments the geo.Caching sites are limited to a particular entities property. For example, a business could create an electronic geo.Caching course in their buildings and/or campus to encourage employees to engage in activities that promote interaction with other employees or the use of health and wellness assets. Additionally, POS devices are enabled, in some embodiments, to act as a geo.Caching location where users can "bump" at any POS site that has a contactless payment feature, which can promote the site and bring in more potential customers.

The methods and systems described herein may be implemented using computer programming or engineering techniques including computer software, firmware, hardware or any combination or subset thereof, wherein the technical effect may include at least one of: (a) establishing a transfer account associated with the mobile device, (b) initiating, by the mobile device, a transfer of an identifier encoded in a geo.Chip to the mobile device, (c) receiving, by the mobile device, the identifier and a geolocation of the mobile device, (d), transmitting the received identifier and geolocation for verification of the identifier using the geolocation, and (e) receiving, by the mobile device, an indication of the units of value associated with the geo.Chip location.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

As used herein, an element or step recited in the singular and proceeded with the word "a" or "an" should be understood as not excluding plural elements or steps, unless such exclusion is explicitly recited.

Furthermore, references to "example embodiment" or "one embodiment" of the present disclosure are not intended to be interpreted as excluding the existence of additional embodiments that also incorporate the recited features.

FIG. 1 is a schematic diagram illustrating an exemplary multi-party transaction card industry system 20 for enabling payment-by-card transactions in which merchants 24 and card issuers 30 do not need to have a one-to-one special relationship and mobile devices can be used for contactless transactions for offers or payments. Embodiments described herein may relate to a transaction card system, such as a credit card payment system using the MasterCard® interchange network. The MasterCard® interchange network is a four-party payment card interchange network that includes a plurality of special purpose processors and data structures stored in one or more memory devices communicatively coupled to the processors, and a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

System 100 may interact with a geo.Server 34 using a mobile device 36 through a wireless connection 38. Cardholder 22 may use mobile device 36 to interrogate a geo.Chip tag 40 that includes a geo.Chip 42. As used herein, geo.Chip 42 may include RFID, NFC, Bluetooth, or other communications technology to wirelessly transmit an identifier that uniquely identifies that geo.Chip 42. Tag 40 may include any substrate that can be used to handle and secure geo.Chip 42 in a predetermined location. Tag 40 may include indicia, lights, speakers, or other attention-getting techniques for making a user aware of the presence of tag 40 at that location.

Figure 2:
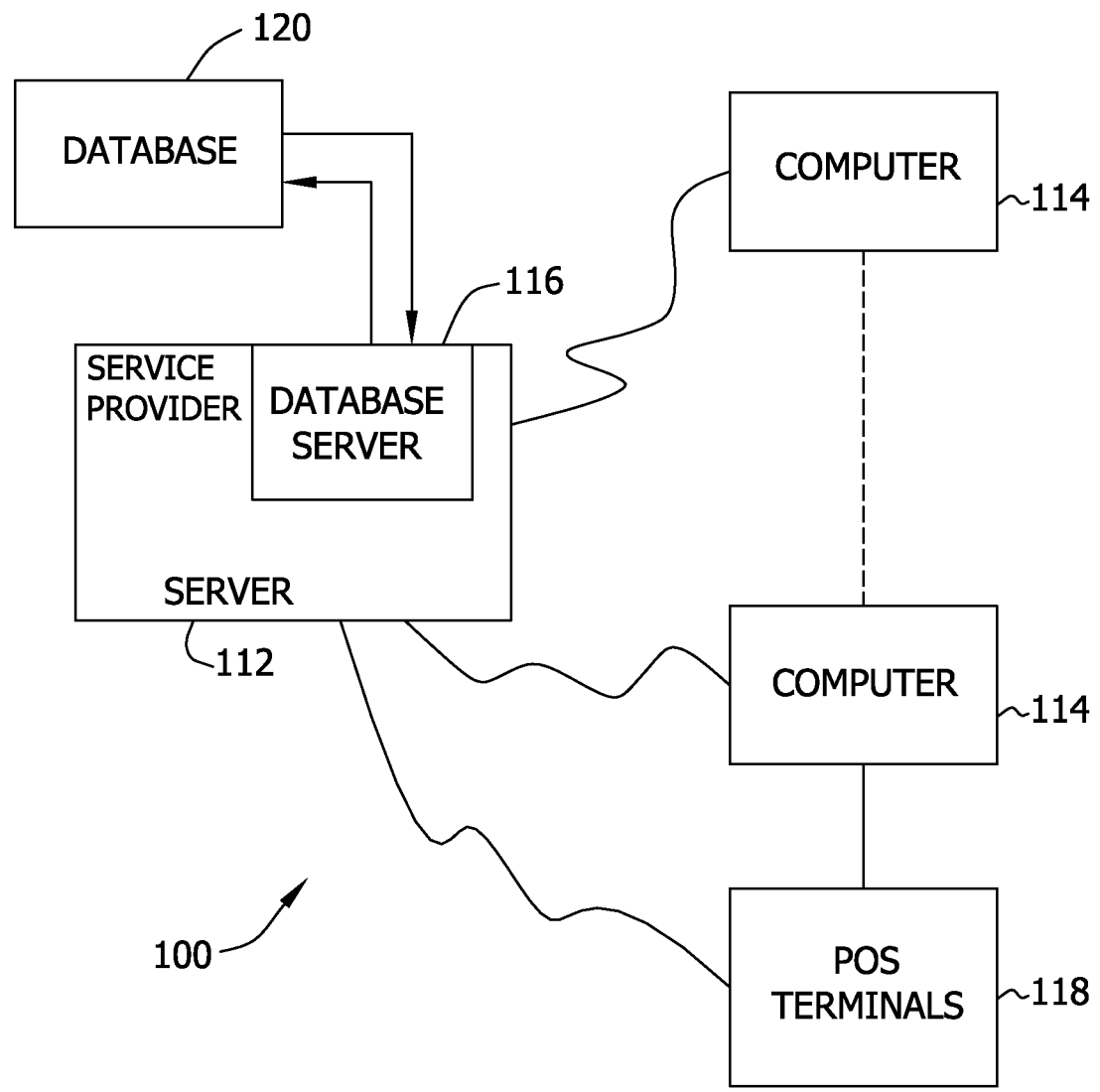

FIG. 2 is a simplified block diagram of an exemplary processing system 100 including a plurality of computer devices in accordance with one embodiment of the present disclosure. In the example embodiment, system 100 may be used for performing contactless payment card transactions and/or managing a plurality of geo.Caching mobile devices 36 and geo.Chips 42.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store locations of a plurality of geo.Chips 42, offers associated with each geo.Chip 42, and offers received by mobile devices 36 associated with cardholders 22 or other users.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment system, a biller, and/or a geo.Caching management system. The geo.Caching management system may be associated with cardholders' 22 mobile device 36, interchange network 28, or with an outside third party in a contractual relationship with interchange network 28. Accordingly, each party involved in processing transaction data are associated with a computer system shown in system 100 such that the parties can communicate with one another as described herein.

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
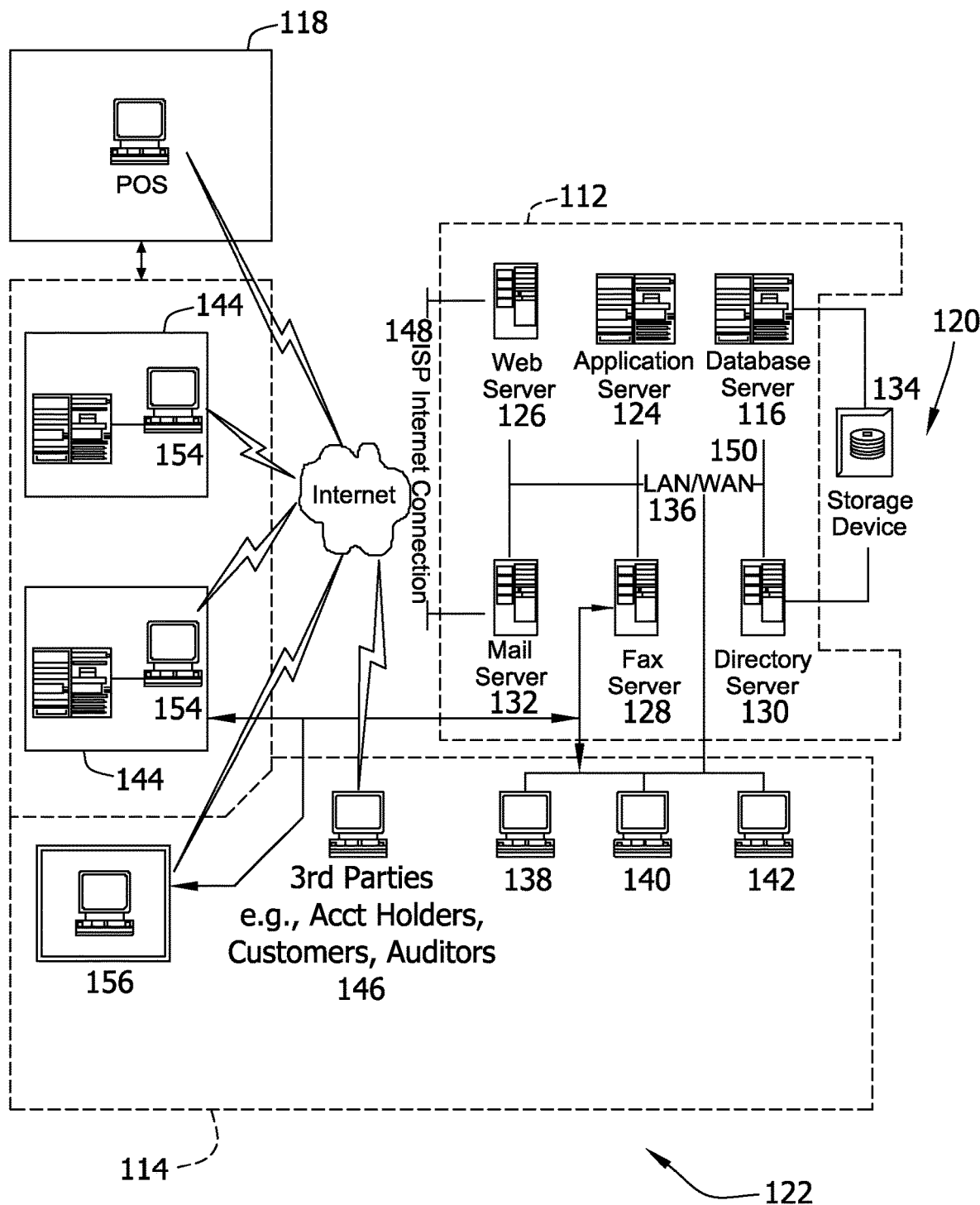

FIG. 3 is an expanded block diagram of an exemplary embodiment of a server architecture of a processing system 122 including other computer devices in accordance with one embodiment of the present disclosure. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
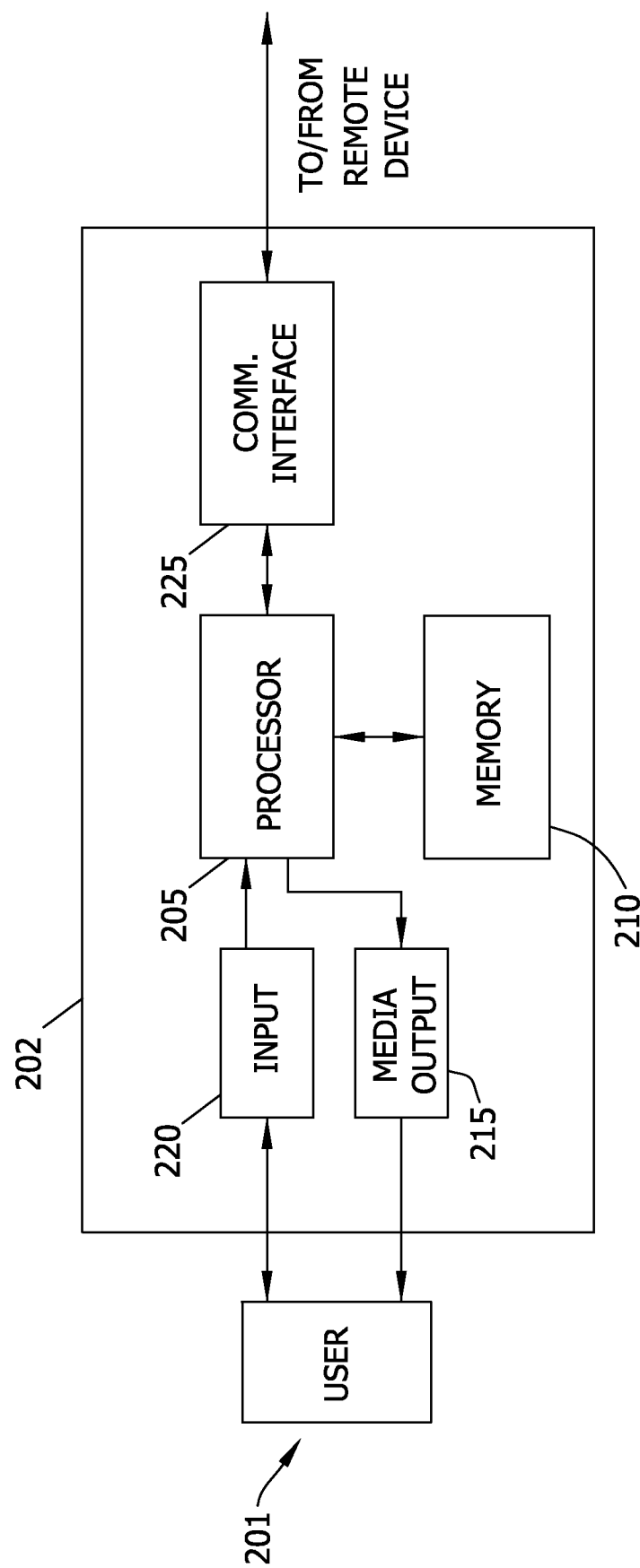

FIG. 4 illustrates an exemplary configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
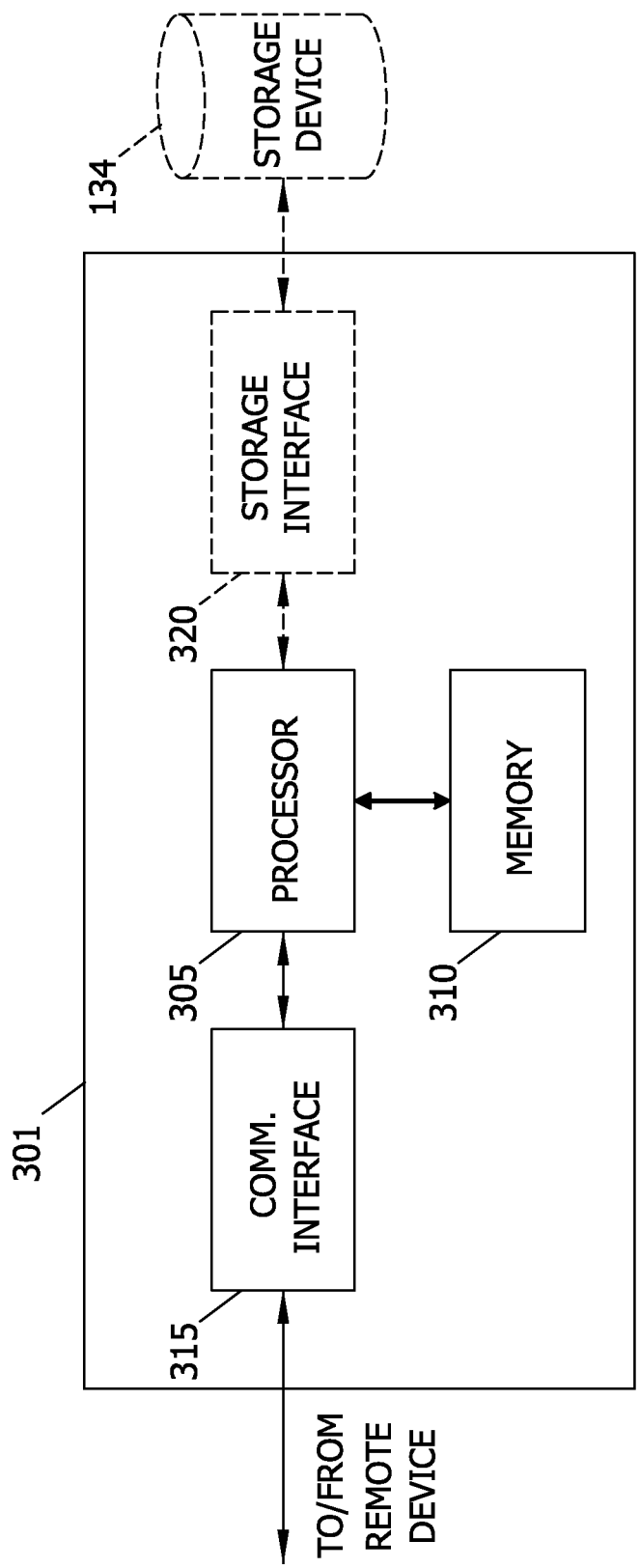

FIG. 5 illustrates an exemplary configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
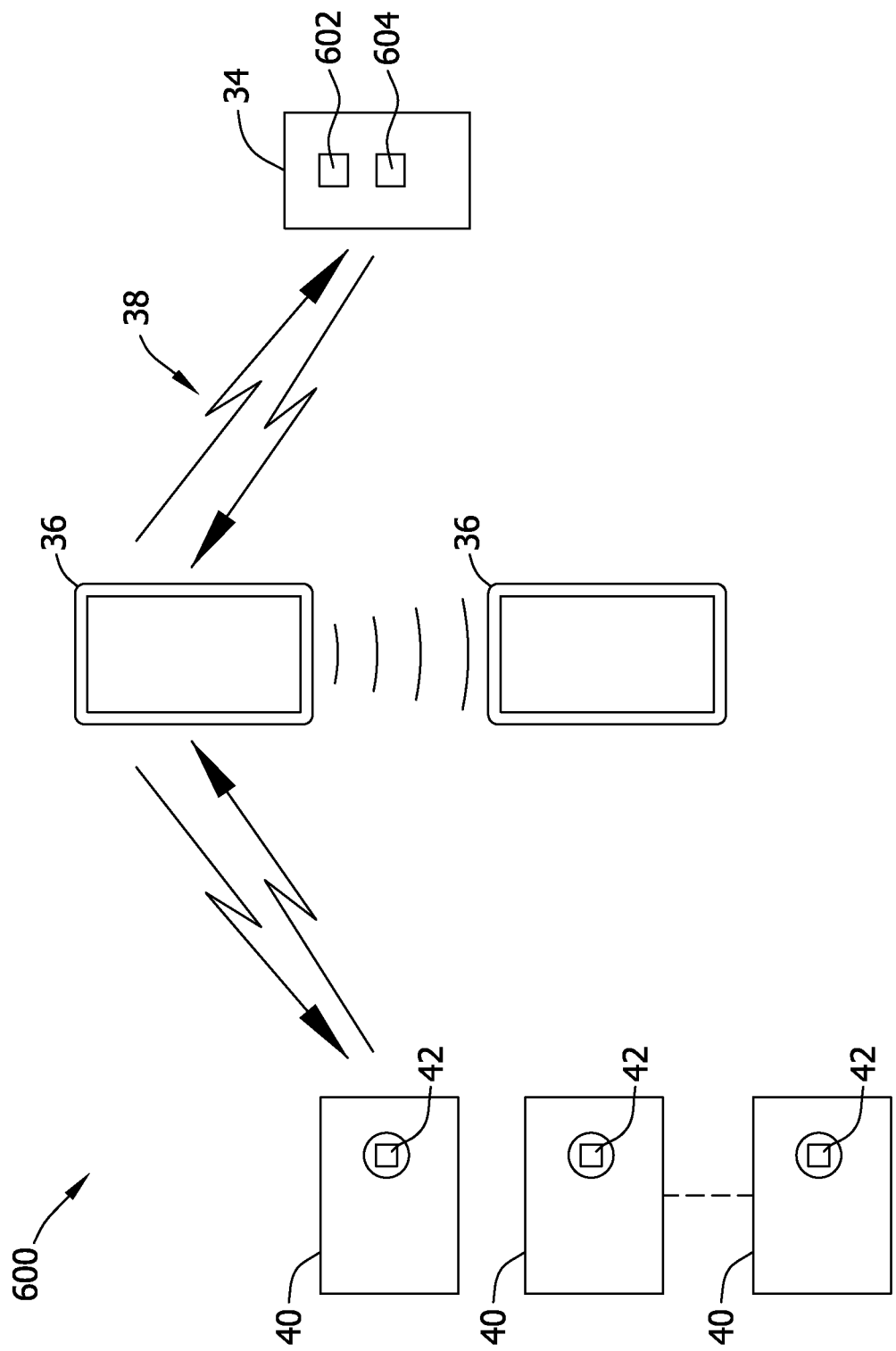

FIG. 6 illustrates a data flow diagram for a geo.Chip management subsystem 600 associated with system 100 (shown in FIG. 1). In the example embodiment, subsystem 600 may be used for transferring electronic units of value to a mobile device or between mobile devices. Subsystem 600 includes electronic communication network 38, mobile device 36 communicatively couplable to network 38 and configured to determine its location in geographic coordinates. Subsystem 600 includes also includes a plurality of semiconductor chips, which may be referred to as geo.Chips 42 that each includes an identifier unique to an associated one of the plurality of geo.Chips 42. The geo.Chips 42 are each interrogatable by mobile device 36 whereby mobile device 36 is able to determine the unique identifier of the interrogated geo.Chip 42. Subsystem 600 also includes geo.Server 34 that is communicatively couplable to network 38. Geo.Server 34 includes a processor 602 communicatively coupled to a memory device 604. In the example embodiment processor 602 is programmed to receive a request for respective locations of semiconductor chips positioned proximate a selected location and transmit to a third party server the respective locations for a fee paid from the third party to the location provider.

The program instructing processor 602 may be embodied on machine-readable media. The terms "machine-readable medium" and "computer readable medium", as used herein, refer to any medium that participates in providing data that causes a machine to operate in a specific fashion. In an embodiment implemented using subsystem 600, various machine-readable media might be involved in providing instructions/code to processor(s) 602 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 604. Volatile media includes, without limitation, dynamic memory, such as working memory. Transmission media includes coaxial cables, copper wire and fiber optics, various components of the communication networks. Transmission media can also take the form of waves (including without limitation radio, acoustic and/or light waves, such as those generated during radio-wave and infra-red data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

In another example embodiment, processor 602 is programmed to receive, from mobile device 36, the unique identifier from an interrogated geo.Chip 42 and the geographic coordinates determined by mobile device 36 proximate a time of the interrogation. The unique identifier can be used to determine a value associated with the interrogated geo.Chip 42 and the geographic coordinates of mobile device 36 at the time the unique identifier is acquired can be used to verify the authenticity of the interrogation and facilitate reducing potential fraud in acquiring the unique identifiers. When the value associated with the interrogated geo.Chip 42 is determined, the value can be credited to the account associated with mobile device 36 if the geographic coordinates match geographic coordinates of the interrogated geo.Chip 42. In various embodiments, the units of value may represent a currency or currency equivalent, a discount offer from a merchant, goods, or services.

To find the locations of geo.Chips 42, a user may opt-in to a notification feature that sends a push notification, for example, via email, text, or an ad on a website being viewed by the user using mobile device 36. The user may set a radius of a current location, an area or landmark that the user will be visiting, or other parameters to indicate a general area of where or how close geo.Chips 42 need to be for the user to receive the push notification. Moreover, the user can request a listing of nearby geo.Chips 42 directly from geo.Server 34 or may include geo.Chips 42 as a reported feature or layer in an app configured to display, for example, ATM locations, navigation directions, or other location dependent items. The display of the geo.Chips 42 locations may be selectable by the user based on whether the user intends to find and participate in geo.Caching at the current time. In other various embodiments, a route of geo.Chip locations can be requested and displayed. For example, a user going on vacation may indicate a destination and may be presented with various discount or free offers available at the destination. To earn the various discount or free offers available the user may be inclined to stop at geo.Chip 42 locations along the route to the destination. Interrogating the geo.Chips 42 at such locations could earn the user points or other units of value toward events at the destination, but also to venues and service providers along the route.

For example, during a first day of a three-day driving trip to a destination, subsystem 600 could determine that meals and lodging along the route may be needed and offers for those types of services could be specifically presented to the user as places where a discount is available during the trip and that could earn points to be used at the final destination.

In addition, geo.Chip 42 locations may be presented to a plurality of users via their mobile devices 36 for partaking in a game activity or scavenger hunt. Users could progress toward greater and greater rewards during the activity as they do better at competing for points or offers. For example, an offer or reward for interrogating a specific geo.Chip 42 may be valued differently depending on a timing after the start of the activity or the difficulty of answering a challenge or trivia question associated with the geo.Chip 42 location or theme of the activity. Each time a user finds and interrogates each sequential geo.Chip 42, a value received may change and/or a location of a next geo.Chip 42 may be modified.

The game aspect of electronic geo.Caching incents users to use the geo.Chip 42 capability of their mobile device 36 and familiarizes them to the ease of use of the system, such that the users would be more inclined to use the contactless interrogation method of using their payment card account.

Figure 7:
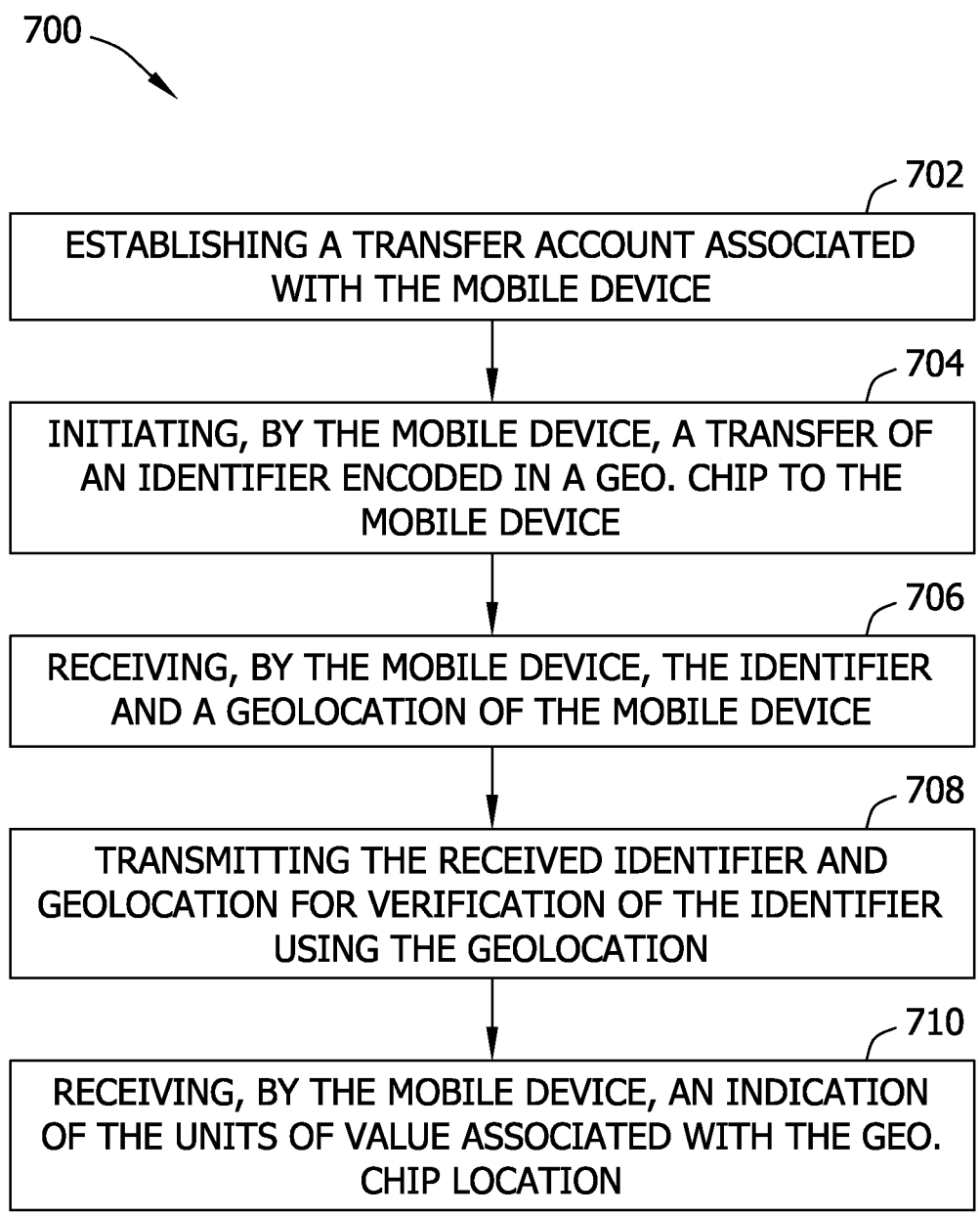

FIG. 7 is a flow diagram of an example method 700 of transferring electronic units of value to a mobile device in accordance with an example embodiment of the present disclosure. In the example embodiment, method 700 includes establishing 702 a transfer account associated with the mobile device, initiating 704 a transfer of an identifier encoded in a geo.Chip to the mobile device, receiving 706, by the mobile device, the identifier and a geolocation of the mobile device. Typically, the mobile device interrogates the geo.Chip using a wireless signal, for example, NFC or bump technology to determine the unique identifier. Moreover, locating the geo.Chip may entail following a map or directions on the mobile device that displays a relative difference in position of the geo.Chip and the mobile device. Method 700 also includes transmitting 708 the received identifier and geolocation for verification of the identifier using the geolocation, and receiving 710, by the mobile device, an indication of the units of value associated with the geo.Chip location. Further, the units of value may be traded amongst users of the mobile devices using NFC or bump technology. If two users determine that each possess a unit of value desired by the other user, they can link their mobile devices and initiate a trade of the units of value, whether they be a coupon for goods, services, or a discount, or units of monetary value. In another embodiment, indication of the units of value associated with the geo.Chip location may be displayed on a website accessible to the user. In various embodiments, locating a geo.Chip location can include, for example, receiving a push notification of the geo.Chip location at the mobile device, receiving a response to a request for a geo.Chip location, and a graphical display of the geo.Chip location with respect to a current location of the mobile device.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 602, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

The above-described embodiments of a method and system of transferring units of value to a mobile device provides a cost-effective and reliable means for providing a framework for incentivizing users to adopt a relatively new payment technology. As a result, the methods and systems described herein facilitate increasing consumer awareness and us of contactless payment card transactions in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-based method for transferring electronic units of value to a mobile electronic geocaching device, the method comprising:
   establishing a transfer account associated with the mobile electronic geocaching device;
   activating a display application of the mobile electronic geocaching device to display instructions for locating a geo.Chip separate from the mobile electronic geocaching device;
   positioning the mobile electronic geocaching device within a predefined distance from the geo.Chip based on the displayed instructions;
   interrogating, after the step of positioning, the geo.Chip by the mobile electronic geocaching device;
   transferring, upon initiation of the step of interrogating, an identifier encoded in the geo.Chip from the geo.Chip directly to the mobile electronic geocaching device when the mobile electronic geocaching device is within the predefined distance from the geo.Chip, the identifier uniquely identifying the geo.Chip;
   receiving the transferred identifier and a geolocation of the mobile electronic geocaching device at the time of interrogation;
   verifying that the received geolocation matches a location of the geo.Chip associated with the transferred identifier;
   associating units of value with the geo.Chip location; and
   receiving, by the mobile electronic geocaching device, an indication of the units of value associated with the geo.Chip location, based on the step of verifying, other than during a purchase transaction.

2. The computer-based method of claim 1, wherein the step of activating comprises receiving, at the mobile electronic geocaching device, at least one of a push notification of the geo.Chip location, a response to a request for a geo.Chip location, and a graphical display of the geo.Chip location with respect to a current location of the mobile electronic geocaching device.

3. The computer-based method of claim 1, wherein the step of interrogating comprises using a wireless signal.

4. The computer-based method of claim 1, wherein the step of activating comprises using an indication displayed on the mobile electronic geocaching device to follow a path to the geo.Chip location.

5. The computer-based method of claim 1, wherein the step of transferring the identifier comprises using at least one of a bump technology and a near-field communications (NFC).

6. The computer-based method of claim 1, wherein the units of value comprise a coupon for a discount at a merchant and wherein receiving, by the mobile electronic geocaching device, an indication of the units of value associated with the geo.Chip location comprises:
   receiving a first electronic coupon for a first merchant; and
   trading the electronic coupon for a second electronic coupon for a second merchant that is accessible via a second consumer mobile device using a communication link between the mobile electronic geocaching device and the second consumer mobile device.

7. A computer-based method for transferring electronic units of value to a mobile electronic geocaching device, the method comprising:
   receiving, by a geo.Server, user information through an electronic communications network;
   establishing an account for the user associated with the user information;
   activating a display application of the mobile electronic geocaching device to display instructions, viewable by the user, for locating a first geo.Chip separate from the mobile electronic geocaching device;
   interrogating, by the mobile electronic geocaching device, the geo.Chip when the mobile electronic geocaching device is within a predefined distance from the first geo.Chip;
   transferring, upon initiation of the step of interrogating, an identifier encoded in the first geo.Chip from the first geo.Chip directly to the mobile electronic geocaching device, the identifier uniquely identifying the first geo.Chip;
   receiving, by the geo.Server from the mobile electronic geocaching device, the transferred identifier and a geolocation of the mobile electronic geocaching device at the time of interrogating;

determining, by the geo.Server, that the transferred identifier is associated with an active offer;
verifying that the received geolocation matches a location of the geo.Chip at the time of interrogating; and
when the identifier is associated with an active offer and the received geolocation matches a location of the first geo.Chip, crediting the account with a value associated with the identifier.

8. The computer-based method of claim 7, further comprising transmitting the value associated with the identifier to the mobile electronic geocaching device.

9. The computer-based method of claim 7, further comprising transmitting a geo.Chip location to the mobile electronic geocaching device at the time of interrogating.

10. The computer-based method of claim 7, further comprising transmitting a second geo.Chip location in a series of geo.Chip locations to the mobile electronic geocaching device.

11. The computer-based method of claim 7, further comprising:
receiving a request for a geo.Chip location from the mobile electronic geocaching device, the request including an indication of a type of offer sought and a radius of search;
matching the type of offer sought with active offers within the radius of search; and
transmitting the matched active offers to the mobile electronic geocaching device.

12. The computer-based method of claim 7, further comprising receiving indication of a payment authorization for a financial transaction contemporaneous with crediting the account with a value associated with the identifier.

13. A system for transferring electronic units of value to a mobile electronic geocaching device, said system comprising:
an electronic communication network;
a mobile electronic geocaching device communicatively couplable to said network said mobile electronic geocaching device configured to determine its location in geographic coordinates;
a plurality of electronic geocaching semiconductor chips separate from the mobile electronic geocaching device, each electronic geocaching semiconductor chip comprising an identifier unique to an associated one of said plurality of electronic geocaching semiconductor chips, each of said plurality of electronic geocaching semiconductor chips being configured to be interrogated by said mobile electronic geocaching device, whereby said mobile electronic geocaching device is configured to determine the unique identifier of the interrogated one of said plurality of electronic geocaching semiconductor chips; and
a geo.Server communicatively couplable to said electronic communication network, said geo.Server comprising a processor communicatively coupled to a memory device; said geo.Server programmed to:
receive a request for respective locations of electronic geocaching semiconductor chips positioned proximate a selected location;
transmit to a third party server the respective locations for a fee paid from the third party to the location provider;
receive, from the mobile electronic geocaching device, the respective unique identifier from an interrogated one of said plurality of semiconductor chips and the geographic coordinates determined by said mobile electronic geocaching device at a time of the interrogation;
determine a value associated with the interrogated semiconductor chip; and
credit an amount of the value to an account associated with said mobile electronic geocaching device upon verification, by the geo.Server, that the geographic coordinates determined by the mobile electronic geocaching device match a location of the interrogated semiconductor chip.

14. The system of claim 13, wherein the units of value comprise at least one of currency or currency equivalent, a discount offer from a merchant, goods, and services.

15. The system of claim 13, wherein the mobile electronic geocaching device is configured to receive the geographic coordinates of one of the plurality of semiconductor chips in at least one of a push notification based on a proximity of said mobile electronic geocaching device to any of the plurality of semiconductor chips, a message in response to a request for a semiconductor chip location, and a message in response to a challenge question.

16. The system of claim 13, wherein said geo.Server is programmed to determine a value associated with the interrogated semiconductor chip using a database stored in the memory device.

17. The system of claim 13, wherein said plurality of semiconductor chips are each positioned in a predetermined location selectable by a merchant.

18. The system of claim 13, wherein said plurality of semiconductor chips are positioned in predetermined locations along a route to be traversed by the mobile electronic geocaching device.

19. The system of claim 13, further comprising a web server programmed to host a geopass website or web page, the web server communicatively couplable to said geo.Server.

* * * * *